(12) United States Patent
Coney et al.

(10) Patent No.: US 6,874,453 B2
(45) Date of Patent: Apr. 5, 2005

(54) TWO STROKE INTERNAL COMBUSTION ENGINE

(75) Inventors: Michael Willboughby Essex Coney, Swindon (GB); Roger Richards, Henfield (GB)

(73) Assignee: Innogy Plc, Swindon (GB)

( * ) Notice: Subject to any disclaimer, the term of this patent is extended or adjusted under 35 U.S.C. 154(b) by 0 days.

(21) Appl. No.: 10/240,388

(22) PCT Filed: Mar. 30, 2001

(86) PCT No.: PCT/GB01/01471

§ 371 (c)(1),
(2), (4) Date: Apr. 28, 2003

(87) PCT Pub. No.: WO01/75283

PCT Pub. Date: Oct. 11, 2001

(65) Prior Publication Data

US 2003/0159665 A1 Aug. 28, 2003

(30) Foreign Application Priority Data

Mar. 31, 2000 (GB) .............................. 0007923

(51) Int. Cl.⁷ .............................. F02B 75/02
(52) U.S. Cl. .............................. 123/65 VD
(58) Field of Search .............. 123/65 VD, 65 V, 123/65 VB, 65 VC, 65 SP, 65 P, 65 A, 65 R

(56) References Cited

U.S. PATENT DOCUMENTS

| | | |
|---|---|---|
| 4,300,486 A | 11/1981 | Lowther |
| 4,905,646 A | 3/1990 | Tanahashi |
| 4,995,348 A | 2/1991 | Melchior |
| 5,020,487 A | 6/1991 | Krueger |
| 5,063,886 A | 11/1991 | Kanamaru et al. |
| 5,195,486 A | 3/1993 | Ishii |
| 5,271,362 A | 12/1993 | Nakamura et al. |

FOREIGN PATENT DOCUMENTS

| | | |
|---|---|---|
| EP | 0 384 492 A2 | 8/1990 |
| GB | 1120248 | 8/1965 |
| GB | 2 202 582 A | 9/1988 |
| JP | 10-103076 A | 4/1998 |
| WO | 87/02043 A1 | 11/1986 |

Primary Examiner—Tony M. Argenbright
Assistant Examiner—Hyder Ali
(74) Attorney, Agent, or Firm—Birch, Stewart, Kolasch & Birch, LLP.

(57) ABSTRACT

A two stroke internal combustion engine having a compressed air inlet port and an exhaust port the flow through which is controlled by suitable valves. Fuel is injected through a fuel injector. The timing of the opening of the valve is such that, as the piston approaches top dead centre and with the air inlet valve closed, the exhaust valve is closed such that some exhaust gas is trapped and compressed in the combustion chamber thereby increasing the temperature within the combustion chamber and hence facilitating ignition. The invention also contemplates initiating combustion before the air inlet valve is closed.

79 Claims, 3 Drawing Sheets

TWO STROKE INTERNAL COMBUSTION ENGINE

This application is the national phase under 35 U.S.C. § 371 of PCT International Application No. PCT/GB01/01471 which has an International filing date of Mar. 30, 2001, which designated the United States of America.

The present invention relates to a two stroke internal combustion engine. More particularly, the invention relates to the processes of fuel ignition and combustion in such an engine.

It has long been recognised that the compression stroke of a conventional reciprocating internal combustion engine requires significant amounts of energy, which to a certain extent can be regarded as a parasitic drain on the performance of the engine. One of the reasons for this is that the air induced into a conventional engine is heated by contact with the hot cylinder head, liner and piston. The work of compression is significantly increased by any process which increases the temperature.

The compression work can be reduced by compressing the air in a separate cylinder which can be much cooler than the cylinders in which the combustion occurs. A further benefit of external compression of the air is that it is possible to save fuel by pre-heating the compressed air with hot engine exhaust gases. Such an arrangement is disclosed in U.S. Pat. No. 4,300,486 which describes a two or four stroke engine in which compressed air is supplied to the combustion cylinders from a storage tank. The air is compressed efficiently using power from a source external to the engine.

A development of this idea is disclosed in U.S. Pat. No. 4,476,821 which has a reciprocating compressor mechanically coupled to the crank shaft of the engine to provide a constant supply of compressed air to the inlet of each combustion cylinder.

U.S. Pat. No. 4,040,400 discloses a similar arrangement in which the compression is done as a two stage process with intercooling between the two stages to improve efficiency.

The above concepts were taken a stage further in WO 94/12785 which discloses a recuperated two stroke engine including an air compression cylinder with an intense water spray injection, followed by a downstream water separator. The water spray not only cools the air throughout the compression in order to minimise the work of compression, but also allows a higher compression ratio than can be achieved with conventional reciprocating air compressors. This reduces the number of compression stages required. Indeed, only one stage would normally be required.

In all reciprocating internal combustion engines in which there is external air compression and air preheating, it is necessary to mix the hot, compressed air with fuel and to ignite the mixture in the combustion cylinder(s) of the engine. Depending on the type of fuel, this may not be easy to accomplish in a stable and reliable way. In particular, if the fuel is natural gas, which has a high ignition temperature and a relatively long ignition delay, then it is very difficult to pre-heat the air sufficiently to achieve reliable auto-ignition and combustion. It is of course possible to achieve ignition of natural gas by the use of a pilot fuel, which will ignite at practical air pre-heat temperatures. Indeed conventional dual fuel engines and gas diesels use this method, but there are disadvantages in terms of the costs of the extra equipment and storage of the pilot fuel. Also significant is the effect of the pilot fuel in increasing the emission of nitrogen oxides.

Another common method of igniting natural gas mixtures is to use spark ignition, but this is normally used only where the natural gas is already mixed with the air prior to entry into the cylinder. Spark ignition of premixed air and fuel works well in small engines having a near-stoichiometric air-fuel ratio, but is harder to achieve in modern large engines employing lean burn combustion to achieve reduced NOx emissions. In this case, the energy of the spark needs to be supplemented by the use of ignition in a small pre-chamber. The mixture in the pre-chamber is not lean, but at near stoichiometric proportions, and can therefore be ignited by the spark to produce a jet of burning gas, which has sufficient energy to ignite the main mixture. Apart from the extra complexity of the pre-chamber, the use of spark ignition has the disadvantage that the environment of the pre-chamber is very hostile to the spark plugs and they have to be replaced at frequent intervals.

The present invention therefore aims to provide a way of igniting fuel, which is not premixed, in a two stroke internal combustion engine with external air compression which provides reliable combustion, a simple construction with low maintenance, and the ability to use a wide range of combustible fuels including those which are hard to ignite such as natural gas.

According to the present invention a two stroke internal combustion engine comprises at least one cylinder, the or each cylinder having a piston reciprocably movable within the cylinder and defining a combustion chamber, the or each combustion chamber having a compressed air inlet port with an air inlet valve for controlling flow into the combustion chamber, a fuel injector through which fuel is injected into the combustion chamber, and an exhaust port with an exhaust valve for controlling flow out of the combustion chamber; and control means for controlling the air inlet and exhaust valves in relation to the motion of the piston such that the exhaust valve is closed substantially before the piston reaches top dead centre and substantially before the air inlet valve is opened, such that some exhaust gas is trapped and compressed in the combustion chamber.

The exhaust gas is by its nature already hot (normally 500–800° C.). Once the exhaust valve is closed and with the air inlet valve closed, the piston continues to move to top dead centre and compresses the exhaust gas within the combustion chamber. For a given pressure ratio, the absolute temperature after compression is proportional to the absolute temperature at the start of compression. By selecting an appropriate pressure ratio, the compressed exhaust gas can be raised to a high enough temperature that it can be made to ignite even fuels of low ignition quality such as natural gas.

The invention can be carried out without requiring a spark ignition, a pre-chamber or a pilot fuel. Therefore the construction of the engine can be kept simple and the need for maintenance is reduced.

The opening and closing motion of inlet and exhaust valves in an internal combustion engine needs to be carefully controlled. This is because if a valve is seated too quickly, significant damage or rapid wear may occur if the contact is too sudden. Further, valves will generally be operated by a cam and again care must be taken with regard to the contact between the cam and valves. For this reason, the lift profile of an exhaust or inlet valve shows a gentle ramping up at the start of lift to allow the valve actuator to begin to move the valve without damage. Similarly, a gentle ramp down is provided as the valve is closed so that the valve is seated gently. The ramps may occupy a significant proportion of the piston cycle (typically 20° of crank angle). However, during such time very little flow will occur past the valve element. Therefore, to all intents and purposes, the valve element is closed during this time, even though it is not physically fully seated. Therefore, for the avoidance of doubt, for the sake of this document, the valve is not considered to be open until it has achieved 5% of its maximum lift. Similarly, the valve is deemed to be closed once it has returned to the same position. This definition applies throughout this specification to the claims and description alike. Thus, all references to the valve opening time refer to the time at which the valve opens beyond the 5% lift position. Equally, references to valve closing times refer to the point at which the valve reaches the 5% position on closing.

The relationship between the closing of the exhaust valve, the opening of the air inlet valve, and the piston position is dependent upon several characteristics of the engine and the fuel. These include the residual volume within the cylinder when the piston is at top dead centre, the inlet air temperature and pressure, the type of fuel being used, the temperature of the exhaust gas, the ignition quality of the fuel and the desired temperature of the exhaust gas after compression. Nevertheless, the control means is preferably configured such that the gap between the closure of the exhaust valve and the opening of the air inlet valve is at least 10°, more preferably at least 15°, and most preferably at least 20° of crank angle of a nominal crank shaft driving the piston. The exhaust valve is preferably closed at least 10°, more preferably at least 15°, and most preferably at least 20° of crank angle of a nominal crank shaft driving the piston before top dead centre of the piston. The control means may be configured to open the air inlet valve substantially at top dead centre. However opening of the air inlet valve preferably begins just before (e.g. 3° of crank angle before) top dead centre. This valve opening position is beneficial because the initial inrush of air completes the recompression of the exhaust gas, which has already been partly done by the piston. If the piston is designed to do all of the recompression, then the pressure within the cylinder could exceed that of the air supplied in the port and cause reverse flow through the valve. It is better to allow some margin to avoid this. In fact, simulations of the process show that it is also slightly more efficient to allow the air to complete the final stages of recompression. Recompression by the incoming air has a very similar effect to recompression by the piston, with one major difference, which is that the incoming air mixes with the compressed gas so that the temperature rise is less than would be achieved without the mixing. If too much recompression is done by the incoming air instead of by the piston, then the temperature rise would not be sufficient to ignite certain fuels.

A further advantage of allowing the incoming air to complete the recompression is that the air inlet valve achieves a greater opening at top dead centre.

The control means could be configured to change the opening of the exhaust valve while the engine is running in response to changing engine conditions, but it is simpler to find an optimum setting for the exhaust valve opening which is not adjusted during operation.

The control means is preferably configured to inject fuel into the combustion chamber at substantially the same time as the compressed air is introduced into the combustion chamber. The control means preferably controls the timing of the fuel injection and the profile of the fuel flow rate. Further, it has been found to be beneficial for the control means to inject a small amount of fuel into the combustion chamber after the exhaust valve has closed and before top dead centre. The small quantity of fuel mixes with the high temperature compressed exhaust gas and initiates combustion. This process of ignition is different from the conventional use of a pilot fuel to ignite fuels of low ignition quality, not only because the initiating mechanism is different but also because in the present situation there is no difference between the fuel which initiates combustion and the main fuel. Also in the present situation the same fuel injector injects both the fuel that initiates combustion and the main fuel. The hot exhaust gas contains some oxygen which was not consumed in the previous cycle. Some additional oxygen may be available from hot air, which enters the cylinder through the air inlet valve prior to top dead centre, although this is not essential to the process. The availability of oxygen combined with the high temperature produced by the recompression of the exhaust gases causes ignition of the pre-injected fuel, with a finite but acceptable delay.

The compressed air supplied to the combustion chamber may be provided from a reservoir of compressed air. However, it is preferable for the compressed air to be generated on demand by a compressor, which is preferably a reciprocating compressor driven by the or each piston, preferably via a crank shaft.

For greatest efficiency, the compressor is an isothermal compressor, and a means for heating the compressed air is provided upstream of the compressed air inlet port. The means for heating may be an external heater, but, more efficiently, is a heat exchanger fed with exhaust gas from the combustion chamber which gives up its heat to the compressed air flowing from the compressor to the combustion chamber.

The isothermal compressor is preferably of the type comprising a cylinder in which a further piston is reciprocably movable and defines a compression chamber, an air inlet port with an inlet valve for controlling flow into the compression chamber, a compressed air outlet port with an outlet valve for controlling flow out of the compression chamber, means for spraying liquid into the compression chamber during the compression stroke of the further piston, and a separator provided downstream of the compressed air outlet port to separate the liquid from the compressed air. The means for spraying liquid is preferably configured such that, during compression, heat is transferred to the liquid droplets as sensible heat substantially without evaporation of the droplets, since this permits a lower temperature of air during compression.

The compression of the exhaust gas takes place in the combustion chamber which is defined between the walls and head of the cylinder and the top surface of the piston. In its simplest form, with a flat-topped piston, the final clearance volume is essentially a very short cylindrical space. Such a space has a high surface to volume ratio and a significant fraction of heat produced by the exhaust gas compression can be lost. Also, it can be difficult to mix the fuel with the trapped exhaust gas in such a flat, wide clearance volume. Preferably, therefore, a recess is provided in the cylinder head or top piston surface into which recess the fuel is directed when the piston is near the top of its stroke. Most conveniently, this recess is provided by a piston bowl in the upper surface of the piston.

Piston bowls are used in conventional diesel engines to encourage mixing of fuel and air to improve the burning of the fuel. In larger diesel engines, the bowl increases the flow length for vaporisation of atomised liquid sprays. Diesel engines, which employ air compression within the combustion cylinder, must leave sufficient space above the piston for all this air. Thus the trapped volume between piston top and cylinder head at top dead centre is necessarily larger than in engines with external air compression. The shape of the piston bowl in diesel engines has relatively little effect on the ignition process, but it is important for the progress of combustion following ignition.

The primary purpose of the piston bowl when used with the present invention, which applies only to an engine with external air compression, is to facilitate ignition, rather than burning, of fuels such as natural gas without the use of a spark plug, pre-chamber or a separate pilot fuel. This is achieved partly by reduction of heat losses per unit mass of exhaust gas caused by the lower surface to volume ratio and partly by the enhancement of mixing as exhaust gas is rapidly squeezed out of the surrounding clearances into the bowl during the compression stage. In practical terms, the trapped volume at top dead centre is much smaller than in most diesel engines, since it is desirable to re-compress the minimum amount of residual exhaust gas consistent with achieving ignition. Indeed, the volume of the piston bowl is determined by this requirement. The trapped volume within the cylinder at top dead centre including the piston bowl and all clearances preferably amount to less than 3% and more preferably less than 2% of the total cylinder volume at bottom dead centre. In comparison, in a large conventional diesel engine, the trapped volume within the cylinder at top dead centre would be 5% or more of the cylinder volume at bottom dead centre. When a piston bowl is provided, every attempt should be made to reduce the amount of trapped volume which is not accounted for by the piston bowl, since additional compression work has to be done in the gas in this volume to no useful purpose. In practice, however, it is likely that the volume of trapped gas outside the bowl (at top dead centre) may be of the same order as that trapped inside the bowl.

In order to avoid contact between the air inlet valve and the piston and at the same time to minimise the dead space at top dead centre, it is preferable for the air inlet valve to be arranged to open without protruding into the combustion chamber. If the air inlet valve is a poppet valve, this implies that the valve should open in the direction away from the combustion chamber. On the other hand, as the exhaust valve is shut while the piston is close to top dead centre, it can be a conventional inwardly opening valve.

According to a second aspect of the present invention there is provided a method of operating a two stroke internal combustion engine comprising at least one cylinder, the or each cylinder having a piston reciprocably movable within the cylinder and defining a combustion chamber, the or each combustion chamber having a compressed air inlet port with an air inlet valve for controlling flow into the combustion chamber, a fuel injector, and an exhaust port with an exhaust valve for controlling the flow out of the combustion chamber; the method comprising repeating the steps of:

opening the exhaust valve; moving the piston into the combustion chamber to force exhaust gas from the combustion chamber; closing the exhaust valve before the piston reaches top dead centre and trapping some exhaust gas in the combustion chamber; compressing the exhaust gas by further movement of the piston; initiating the opening of the air inlet valve; and introducing fuel into the combustion chamber once the exhaust gas has been compressed to the extent that the temperature in the combustion chamber is sufficient to ignite and combust the fuel expanding the hot combustion gases so as to perform work on the piston.

This method can be used with any combustible fuel, but is best suited to fuels of low ignition quality such as natural gas.

In order to start the engine it is first of all necessary to get the or each piston moving within its cylinder. It is then necessary to provide some alternative way of igniting the fuel within the combustion chamber as before the first ignition no exhaust gas is available for compression.

If an external source of power is conveniently available, for example in a power generating installation where power from the grid electrical supply is available, this can be used to start the pistons moving. On the other hand, if no such external power supply is available, the engine must have its own means of moving the pistons. Preferably, the engine further comprises a reservoir of compressed air and a heater, a method of starting the engine comprising the steps of heating air from the compressed air reservoir, feeding the hot compressed air, into the or each combustion chamber, and expanding the hot compressed air in the or each combustion chamber in order to move the piston down the cylinder.

Once the pistons are moving, it is then necessary to ignite the fuel. The hot compressed air which expands in the combustion chamber as described above to do work against the piston will cool substantially by the time the piston is at bottom dead centre, since no heat will be added by combustion of fuel. The subsequent compression of the fraction of this air which remains in the combustion chamber after the exhaust valve closes will heat the air up again to something like its original temperature, but this may not be hot enough to ignite the fuel. In order to start the engine, particularly with a fuel of low ignition quality such as natural gas, it is necessary to ensure that the low pressure air in the cylinder prior to re-compression is at a similar temperature to the supplied high pressure air.

The start-up method therefore preferably comprises bleeding a flow of hot, compressed air through a restricted aperture into the combustion chamber at a time when cylinder pressure is low. The restricted aperture provides a throttling effect, which, as throttling is an isenthalpic process, will cause the temperature after throttling to remain essentially unchanged. Even if the piston is on its downstroke, such that the cylinder volume is expanding, the bleed flow does not do significant work against the piston since the air pressure in the cylinder remains low during the whole process. To achieve the objective of throttling the air into the cylinder while the pressure is still low allows a choice of timing of the hot air injection during starting. The air can be admitted before the exhaust valve opens, during the period that it is open and/or immediately after the exhaust valve has closed. The choice of timing of the hot air injection during starting may be affected by whether hot compressed air is also being expanded within the cylinder. As mentioned previously, the expansion of hot compressed air may be used as a method of rotating the engine during start-up. However even if other means are available to rotate the engine, hot compressed air could be admitted to the cylinder and expanded simply as a means of warming up the pipework and the engine. If hot compressed air is expanded in the cylinder for any reason, then there would be no purpose in throttling bleed air into the cylinder during the expansion, since it would mix with the cool expanded air. From the point of view of conserving the amount of hot air used for starting, admission of the hot bleed air during and immediately after closing the exhaust valve would be the most attractive option, whichever method is used to turn the engine.

The hot compressed air used for ignition during start-up may be supplied from any source, but if hot compressed air is also used to turn the engine during start-up, then preferably both would be supplied from the same compressed air reservoir and heater arrangement.

The restricted aperture may be provided by a throttle valve in the cylinder head, or the gap between the air inlet valve and the valve seat if the air inlet valve is arranged to open by a fraction of its normal lift.

During the start-up operation, the exhaust valve is opened and closed as normal so that the piston compresses the already hot bleed air as it approaches top dead centre thus further increasing its temperature. Several strokes of the piston would be performed, recompressing bleed air at every stroke, before the first fuel is injected in order to establish the process and warm up the system.

Once the engine is firing, the restricted aperture is closed thereby shutting off the bleed flow. If the throttle valve is used as the restricted aperture, this is simply a matter of closing the valve. If the gap between the air inlet valve and valve seat is used, the gap is closed simply by returning the air inlet valve to its normal operation by fully seating the air inlet valve until it is required to open to admit the main charge of air.

The restricted aperture may be closed immediately the engine begins firing. However, if the restricted aperture is closed gradually, the bleed air is gradually diminished before being stopped, and this can provide for a smoother transition between start-up and normal operation, thereby improving the reliability of the start-up process.

In normal operation, the combustion of the fuel may be initiated in each successive cycle after the air inlet valve is closed to try to achieve constant volume combustion similar to that in a conventional reciprocating engine. However, it has been found preferable for the control means to be arranged to control the air inlet valve in relation to the combustion in the combustion chamber such that the air inlet valve is not closed before combustion is initiated.

This goes against conventional teaching, as it results in some loss of pressure in the combustion chamber. However, it has been found that this disadvantage is more than offset by the fact that this allows time for the combustion process. Also, the conventional approach of having constant volume combustion results in a steep pressure rise within the combustion chamber which increases the temperature of the combustion gases and hence the NOx emissions. Initiating combustion with the pressure rise reduced results in a consequent reduction in NOx emissions.

Preferably, the control means is configured such that under normal operating conditions the gap between the initiation of combustion and the inlet valve being closed is at least 15°, preferably at least 25°, and more preferably at least 30°, of crankangle of a nominal shaft driving the piston.

This particular feature forms an independent aspect of the present invention, which can broadly be defined as a two stroke internal combustion engine comprising at least one cylinder, the or each cylinder having a piston reciprocably movable within the cylinder and defining a combustion chamber, the or each combustion chamber having a compressed air inlet port with an air inlet valve for controlling flow into the combustion chamber, a fuel injector through which fuel is injected into the combustion chamber, and an exhaust port with an exhaust valve for controlling flow out of the combustion chamber; and control means for controlling the air inlet valve in relation to the combustion in the combustion chamber, such that the air inlet valve is not closed before combustion is initiated.

In order to enhance the advantage provided by initiating combustion before closing the air inlet valve, the control means is configured such that under normal operating conditions the gap between the initiation of combustion and the air inlet valve being closed is at least 15°, preferably at least 25°, and more preferably at least 30° of crankangle of a nominal crankshaft driving the piston.

Preferably, the control means is configured to inject a small amount of fuel into the combustion chamber before top dead centre.

Alternatively, this aspect of the invention can be defined as a method of operating a two stroke internal combustion engine comprising at least one cylinder, the or each cylinder having a piston reciprocably movable within the cylinder and defining a combustion chamber, the or each combustion chamber having a compressed air inlet port with an air inlet valve for controlling flow into the combustion chamber, a fuel injector and an exhaust port with an exhaust valve for controlling the flow out of the combustion chamber; the method comprising repeating the steps of:

opening the exhaust valve; moving the piston into the combustion chamber to force exhaust gas from the combustion chamber; closing the exhaust valve; injecting fuel, initiating the opening of the air inlet valve and initiating combustion; and subsequently closing the air inlet valve, such that the air inlet valve is not closed before combustion is initiated.

In a conventional large diesel engine, the fuel is normally injected into the combustion chamber through a central multi-hole injector, with holes arranged symmetrically around the circumference of the injector. In such engines, the fuel is normally directed at a downward angle into a bowl in the piston. However, computer studies of combustion behaviour have shown that this type of nozzle arrangement is not appropriate for the type of engine described in which the air is compressed and heated externally and then introduced into the cylinder essentially simultaneously with the injection of the fuel. The problem is that after top dead centre the incoming air from the air inlet valve rapidly fills most of the volume created by the downwardly moving piston and displaces the mixture of air, combustion gases and fuel to the far side of the chamber. Mixing of the incoming air with the pre-existing gases and the fuel is poor and combustion is relatively slow.

In order to overcome this problem, it is preferable that the or each inlet valve is associated with an air inlet port, the or each air inlet port being associated with an imaginary column defined as the envelope formed by the translation of the area of the inlet port in the direction in which the piston reciprocates; the fuel injector being arranged to direct at least 50%, preferably at least 70% and more preferably 100% of the fuel towards the column or columns.

This forms an independent aspect of the present invention which can be used together with or independently of the previous aspects of the invention and is broadly defined as a two stroke internal combustion engine comprising at least one cylinder, the or each cylinder having: a piston reciprocably movable within the cylinder and defining a combustion chamber, the or each combustion chamber having at least one compressed air inlet port with an associated air inlet valve for controlling flow into the combustion chamber, the or each air inlet port associated with an imaginary column defined as the envelope formed by the translation of the area of the inlet port in the direction in which the piston reciprocates; at least one exhaust port with an exhaust valve for controlling flow out of the combustion chamber; and a fuel injector through which fuel is injected into the combustion chamber, the fuel injector being arranged to direct at least 50% and preferably at least 70% and more preferably 100%, of the fuel towards the column or columns but not towards the or each air inlet valve.

Alternatively, this aspect of the invention can be defined as a method of operating a two stroke internal combustion engine comprising at least one cylinder, the or each cylinder having a piston reciprocably movable within the cylinder and defining a combustion chamber, the or each combustion chamber having: at least one compressed air inlet port with an air inlet valve controlling flow into the combustion chamber, each port being associated with an imaginary column defined as the envelope formed by the translation of the area of the inlet port in the direction in which the piston reciprocates; at least one exhaust port with an exhaust valve for controlling the flow out of the combustion chamber; and a fuel injector for injecting fuel into the combustion chamber; the method comprising the step of injecting at least 50%, preferably at least 70% and more preferably 100% of the fuel towards the column or columns but not towards the or each air inlet valve.

With this arrangement some or all of the fuel is directed into a region directly below the or each air inlet port as defined by the column or columns. This region is essentially that having the air jet or jets, which are produced with the air inlet valve or valves open. The fuel enters the turbulent air stream, is dispersed within it and then carried with the air to all parts of the combustion chamber. This relies heavily on the movement of the incoming air to distribute the fuel. The rapid mixing of fuel and air, which is achieved by this approach, is also beneficial from the point of view of NOx production, since the premixing of air and fuel before combustion dilutes the fuel with excess air and gas and moderates the rise in temperature. This is particularly effective when combustion takes place at near constant pressure.

In order to enhance the effect of using the turbulent air stream to disperse the fuel, the fuel is preferably injected at a shallow angle with respect to the cylinder head. Preferably, the fuel injector injects the fuel at an angle of less than 10° and preferably less than 5° with respect to the cylinder head.

In most cases where each combustion chamber has more than one inlet port, these will be arranged on one side of the cylinder head with the exhaust ports being arranged on the other side. This is important for the geometry of the porting and the pipework outside the cylinder. In this case, at least 80% of the fuel, and preferably at least 90% would be injected towards the side of the cylinder which contains the air inlet ports.

An engine constructed in accordance with the present invention will now be described with reference to the accompanying drawings, in which.

Figure 1:
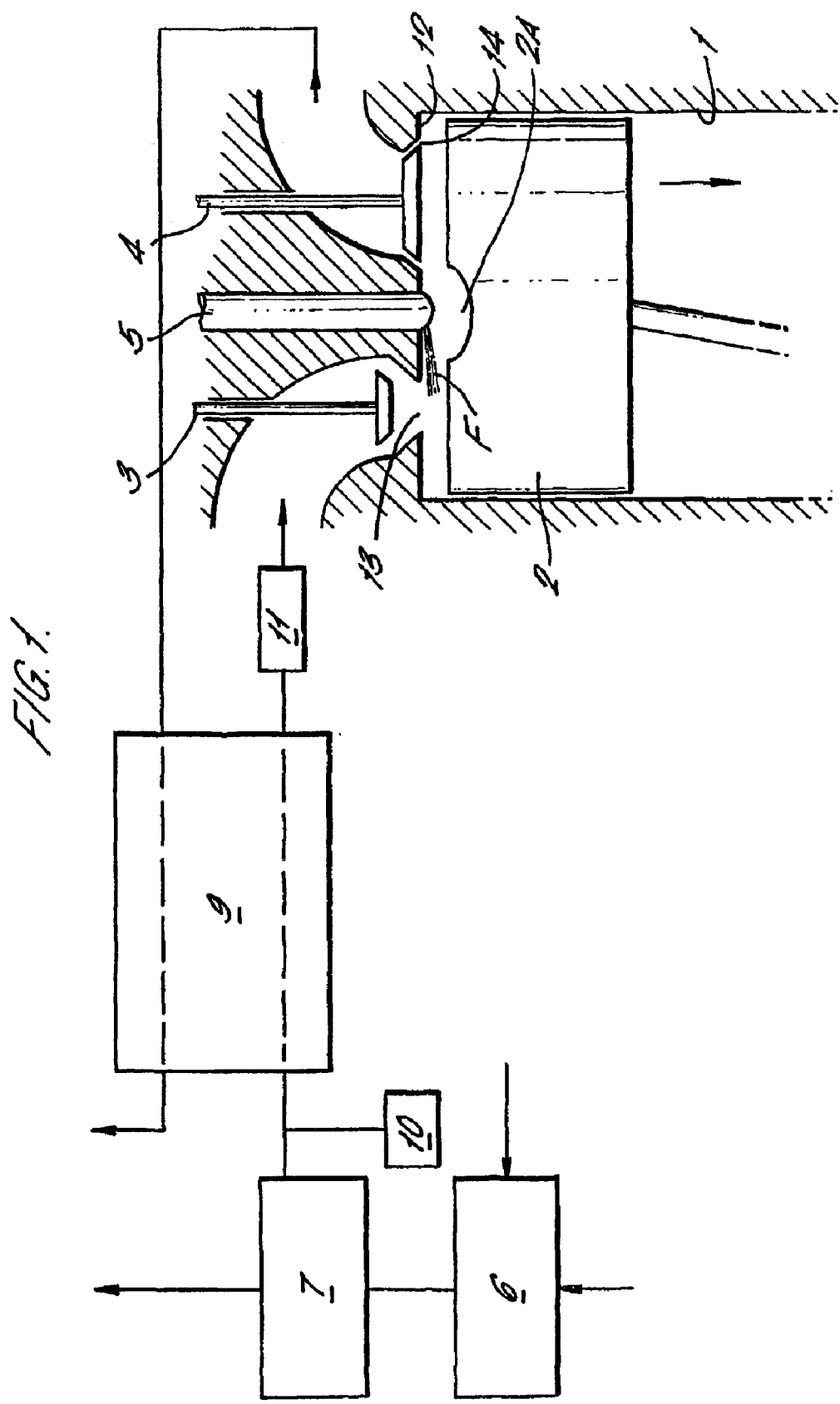
FIG. 1 is a schematic representation of the various elements of the engine.

The engine components shown in FIG. 1 are a schematic representation of components that can be found in FIG. 4 of WO 94/12785.

The engine comprises a combustor in the form of, for example, three cylinders each with a reciprocating piston and with internal combustion of fuel in a two-stroke cycle. The three cylinders are represented schematically in FIG. 1 by a single cylinder 1 and reciprocating piston 2. The upper surface of the piston 2 is provided with a piston bowl 2A located adjacent to fuel injector 5. The pistons 2 of the three combustion cylinders are connected to a common crankshaft (not shown) which is of conventional construction. Each cylinder has two compressed air inlet valves 3, two exhaust outlet valves 4 and a fuel injector 5 (note that only one of each type of valve is shown in FIG. 1).

The combustion cylinders 1 are provided with a supply of hot compressed air. This is generated in isothermal compressor 6 which is a reciprocating compressor in which a piston reciprocates within a cylinder to cause compression. The compression piston may be connected to the same crankshaft as the combustion cylinders 1. During the compression process, water is injected into the isothermal compressor 6 in order to maintain the compression process as close as possible to isothermal. A suitable arrangement of nozzles to achieve isothermal compression is disclosed in WO 98/16741.

The cold compressed air and water are then fed to a separator 7 where the bulk of the water is separated from the compressed air. The compressed air which is now substantially free of water is fed along the line 8 via a recuperator 9 where it receives heat from exhaust gas from the combustion cylinders 1 before entering one of the combustion cylinders 1. All of the elements of the engine described thus far, with the exception of the piston bowl 2A, are present in FIG. 4 of WO 94/12785.

The unique feature of the present invention is in the control of the timing of the valves of the combustor in order to achieve an advantageous ignition process. The control of the timing of the valves is done, for example, with a camshaft in which the cam lobes have suitable profiles to achieve the necessary timing. If the valves are electromagnetically, hydraulically, or pneumatically actuated the same effect can be achieved with a suitable control circuit.

Figure 2:
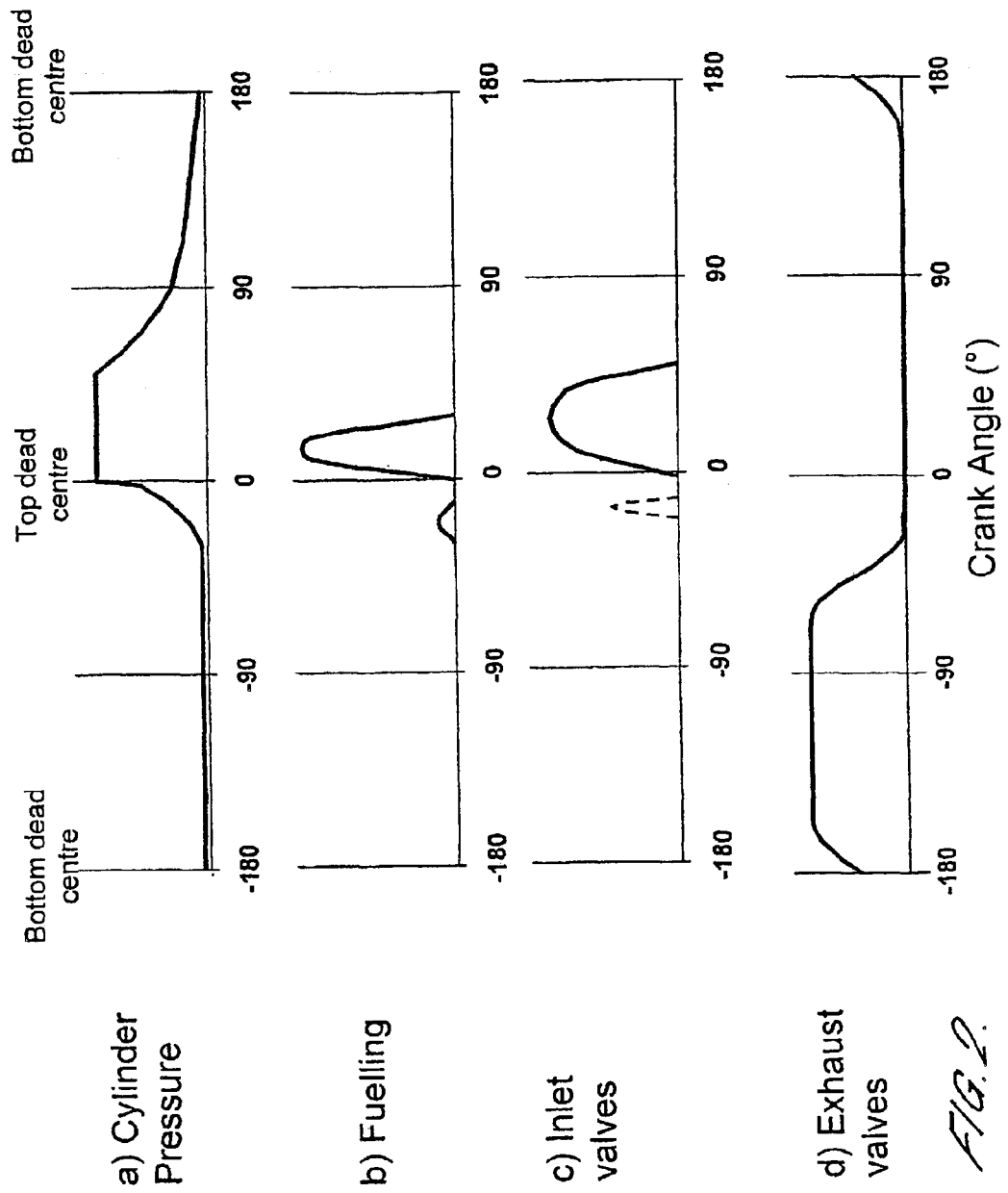
FIG. 2 is a set of graphs illustrating the cylinder pressure, fuel injection, inlet valve position and exhaust valve position as a function of crank angle.

The timing of the cylinder pressure, fuelling, inlet valve opening and exhaust valve opening is shown in FIG. 2, and a complete two-stroke cycle of a single combustion cylinder will now be described based on this drawing. For several combustion cylinders, each will follow the same process with a suitable phase delay.

The exhaust valve begins to open perhaps 20 crankangle degrees before bottom dead centre so that there is a substantial opening by the time bottom dead centre is reached. There is a rapid depressurisation of the cylinder or blowdown at this time. Once the cylinder pressure has equalised with the pressure in the recuperator, the depressurisation ceases. Throughout the majority of the up-stoke of the piston, the cylinder pressure is similar to that in the low pressure side of the recuperator, while the piston 2 forces the exhaust gas out of the cylinder 1 past exhaust valve 4.

The exhaust valve begins to close during the piston upstroke, reaching effective closure (i.e. less than 5% lift) about 25° before top dead centre as shown in FIG. 2D, trapping the remaining exhaust gas in the combustion chamber. Even before this point is reached, there is some pressure rise and after this point there is a substantial further increase in pressure to about 60% of the pressure of the air supplied to the air inlet port. This pressure rise is shown in FIG. 2A. The pressure rise is accompanied by a substantial temperature increase. The final pressure rise up to the pressure of the inlet air occurs very rapidly just before top dead centre when the inlet valve starts to open. This effect is also shown in FIG. 2A. This final pressure rise also causes a further increase in temperature of the trapped exhaust gas, which provides further assistance to the ignition process. On the other hand, the incoming air, which causes this final recompression is cooler, so that the mixed mean temperature is not increased very much. At this time the fuel injector opens briefly in order to inject a small amount of fuel, as shown in FIG. 2(B), which combines with unburnt oxygen in the hot exhaust gas to ignite in the high temperature environment produced by the compression of the exhaust gas.

The inlet valve 3 begins to open shortly before top dead centre as shown by the solid line in FIG. 2(C) to allow hot compressed air into the combustion cylinder 1. At the same time the fuel injector injects the main charge of fuel into the bowl 2A as shown in FIG. 2(B). The fuel injection process may terminate either slightly before the air inlet valve is closed as shown in FIG. 2B and FIG. 2C or it may terminate slightly after air inlet valve closure. This depends on the engine loading, the pressure ratio of the combustor expansion, the speed of the engine and the time delay between fuel injection and combustion. The mixture of the hot compressed air and the main charge of fuel is ignited by the flame resulting from the self-ignition of the fuel injected earlier. The hot combustion gases expand and perform work as the piston 2 is driven downwards on the power stroke. As shown in FIG. 2A, there is a reduction in pressure in the combustion cylinder 1 as the expansion proceeds. Just before bottom dead centre, the exhaust valve begins to open in preparation for the next stroke as shown in FIG. 2(D).

The mechanism for starting the engine on fuels of low ignition quality will now be described. If the engine can be driven by external mechanical or electrical power, this is used to drive the isothermal compressor in order to pressurise the pipework upstream of the combustor air inlet. If no external drive is available, then the pipework may be pressurised using a reservoir of stored compressed air 10, shown in FIG. 1. The compressed air reservoir is preferably situated upstream of the recuperator, since the pipework at this point does not get too hot when the engine is running normally. This avoids the need to design valves which are capable of withstanding very high temperatures.

An air heater is needed at start-up since no heat is available from the recuperator. A convenient method of heating the air supplied to the combustor is to heat the pipework, which runs between the recuperator and the combustor. The heat input required for the purpose of starting the engine is very much less than that which is supplied by the recuperator during normal operation because the air mass flow is so much lower. This is because the rotational speed of the engine is low and because the pressure of air supplied to the compressor is near atmospheric pressure and is not boosted by the operation of a turbocharger during start up. As shown in FIG. 1, a heater 11 is configured around this pipework. The heater may be any one of various forms of electrical heater or it may be a gas or oil burner.

If the engine can be driven by external power during start up then the pistons are already moving up and down in their respective cylinders. If the engine is not driven by external power, the compressed air from the reservoir, which is also heated in the connecting pipework, is expanded in the cylinders in order to provide the power to move the pistons.

Once the pistons are moving it is necessary to ignite the fuel without having any exhaust gas available for recompression to generate the required high temperature.

This is done by providing a bleed flow of compressed air for a period of time during the closing of the exhaust valves. This may be done through a restricted orifice leading into the combustion chamber cylinder 1, but in the case illustrated in FIG. 1 this can be done by opening the inlet valve 3 briefly during the final stages of exhaust valve closure (when the lift is less than 5% of maximum) as indicated by the broken line in FIG. 2C. Since the engine speed during start-up is much lower than during normal operation it is found that the valve opening required to admit the required air is either very small or exists only briefly in time. If the valve opens too much or is open for too long a duration, then too much air may be admitted. This air with added fuel may then be subsequently forced back into the inlet port as the piston continues to rise, which is most undesirable. Another disadvantage is that the compressor, which is likely also to be running at slow speed, may not be able to sustain the required air flow. The exhaust valve is not yet finally closed at this point, and because the engine speed is low and the pressure of the air supplied to the inlet valve is high, it is possible to consume a significant quantity of air if the valve duration is too long. Thus FIG. 2C illustrates a brief admission of air occurring at about 20° before top dead centre.

If the combustor cylinder has more than one air inlet valve, then it may be convenient to use one valve to provide the brief air injection during start-up and use the remaining valve or valves to provide the main air flow after top dad centre. This avoids the need for one valve to open and close twice in the starting cycle.

An alternative to the above procedure for igniting the engine directly using fuel of low ignition quality would be to provide the engine with the facility to start-up on fuel of high ignition quality such as light diesel fuel. The engine would run for sufficient time to allow the recuperator to heat up and then it would be switched over to the fuel of low ignition quality.

Figure 3:
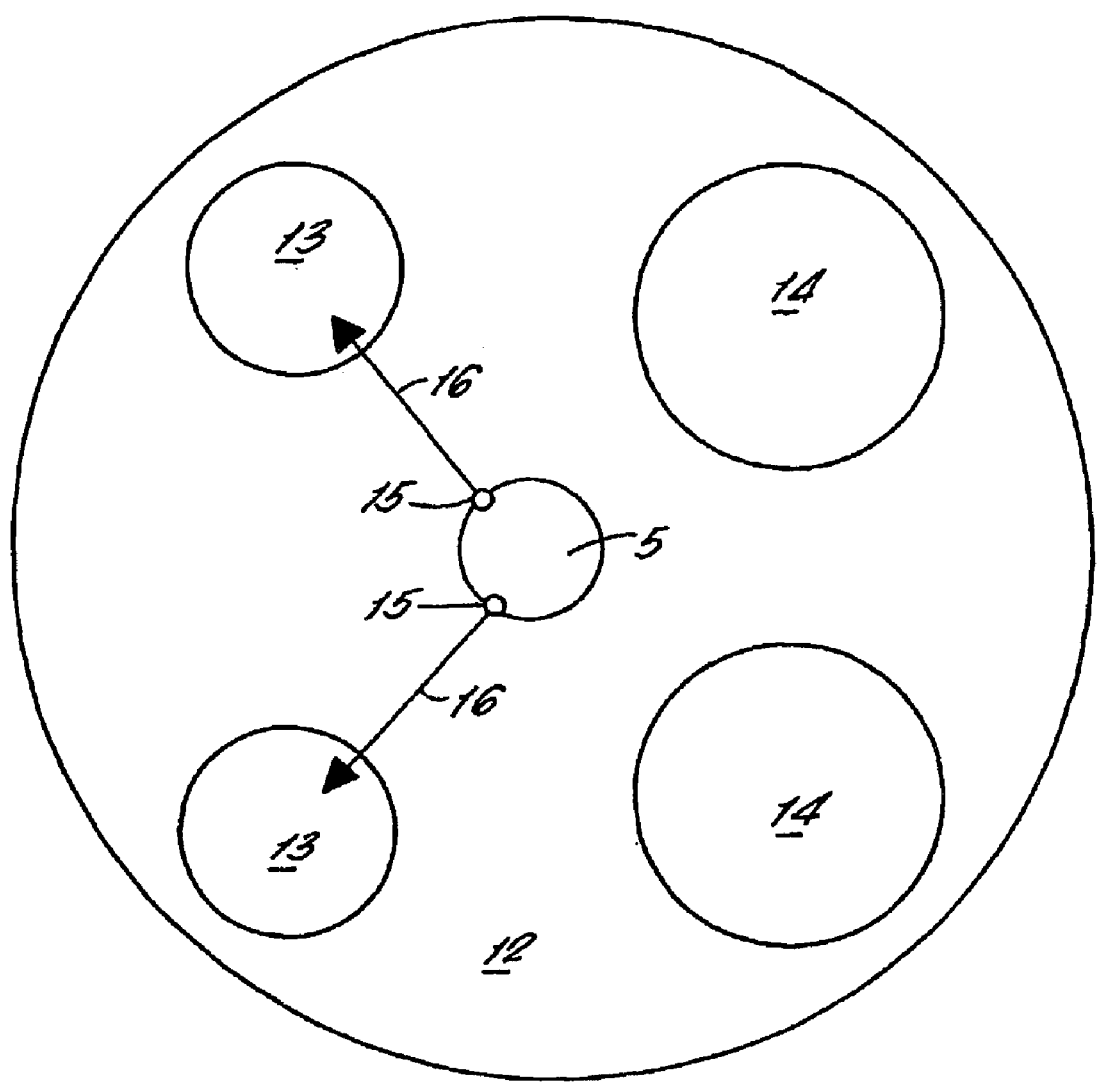
FIG. 3 is a schematic plan view of a cylinder head showing the location of various components.

The injection of the fuel into the combustion chamber will now be described with reference to FIGS. 1 and 3. FIG. 3 shows the cylinder head 12 on one side of which are a pair of compressed air inlet ports 13 each of which is associated with a compressed air inlet valve 3 and on the other side of which are a pair of exhaust gas outlet ports 14 each of which is associated with an exhaust outlet valve. The fuel injector 5 has a pair of outlet orifices 15 which are arranged to direct fuel in the direction of arrows 16 towards the compressed air inlet ports 13. As will be apparent from FIG. 1, the fuel is directed at a slight downward incline with respect to the cylinder head. However, the fuel can alternatively be directed parallel to the cylinder head. The fuel injection is timed so that fuel is injected as air is entering the combustion chamber through the air inlet ports 13 as shown in FIG. 2.

Although FIGS. 1 and 3 indicate that all the fuel is injected into the air jets entering the cylinder, with one injection orifice 15 per air inlet port 13, this is not necessarily always the case. In some cases it may be preferable to have a larger number of nozzle holes, for example to distribute the fuel within the air jet, or to avoid the possibility of the fuel penetrating straight through the air jet. The optimum arrangement will also depend on whether the injected fuel is a gas or a liquid.

As shown in FIGS. 1 and 3, the fuel injector 5 normally protrudes into the piston bowl 2A, which must therefore be positioned around the injector. The injection of fuel directly towards the air inlet ports 3 in the asymmetric manner described above may be thought to cause most of the fuel to escape from the bowl 2A thus negating or reducing the effect of the piston bowl in achieving ignition of fuels which are hard to ignite. However this is not the case, since ignition is achieved at a time when the piston 2 is very close to the top of the cylinder 1 and most of the air, gas and fuel, which is present in the cylinder is squeezed out from the surrounding narrow clearances into the piston bowl 2A. Thus at this early stage of the combustion process, the piston bowl will still perform the function that it is designed for.

What is claimed is:

1. A two stroke internal combustion engine comprising at least one cylinder, the or each cylinder having a piston reciprocably movable within the cylinder and defining a combustion chamber, the or each combustion chamber having a compressed air inlet port with an air inlet valve for controlling flow into the combustion chamber, a fuel injector through which fuel is injected into the combustion chamber, and an exhaust port with an exhaust valve for controlling flow out of the combustion chamber; and control means for controlling the air inlet and exhaust valves in relation to the motion of the piston such that the exhaust valve is closed substantially before the piston reaches top dead centre and substantially before the air inlet valve is opened, such that some exhaust gas is trapped and compressed in the combustion chamber.

2. An engine according to claim 1, wherein the control means is configured such that the gap between the closure of the exhaust valve and the opening of the air inlet valve is at least 10° of crank angle of a nominal crank shaft driving the piston.

3. An engine according to claim 1 or claim 2, wherein the control means is configured such that the gap between closing the exhaust valve and top dead centre is at least 10° of crank angle of a nominal crank shaft driving the piston.

4. An engine according to claim 1 or claim 2 wherein the control means is configured to open the inlet valve just before top dead centre.

5. An engine according to claim 1, wherein the control means is configured to inject fuel into the combustion chamber at substantially the same time as the compressed air is introduced into the combustion chamber.

6. An engine according to claim 1, wherein the control means is configured to inject a small amount of fuel into the combustion chamber after the exhaust valve has closed and before top dead centre.

7. An engine according to claim 6, wherein the small amount of fuel is of the same type as that used for the main injection and is introduced through the fuel injector.

8. An engine according to claim 1, further comprising a compressor for the supply of compressed air to the combustion chamber.

9. An engine according to claim 8, wherein the compressor is a reciprocating compressor driven by the or each piston.

10. An engine according to claim 8 or claim 9, wherein the compressor is an isothermal compressor and the engine further comprises a means for heating the compressed air upstream of the compressed air inlet port.

11. An engine according to claim 10, wherein the means for heating is a heat exchanger fed with exhaust gas from the combustion chamber which gives up its heat to the compressed air flowing from the compressor to the combustion chamber.

12. An engine according to claim 10, wherein the isothermal compressor comprises a cylinder in which a further piston is reciprocably movable and defines a compression chamber, an air inlet port with an inlet valve for controlling flow into the compression chamber, a compressed air outlet port with an outlet valve for controlling flow out of the compression chamber, means for spraying liquid into the compression chamber during the compression stroke of the further piston, and a separator provided downstream of the compressed air outlet port to separate the liquid from the compressed air.

13. An engine according to claim 12, wherein the means for spraying liquid is configured such that, during compression, heat is transferred to the liquid droplets as sensible heat substantially without evaporation of the droplets.

14. An engine according to claim 1, wherein, in the combustion chamber, a recess is provided in the cylinder head or top piston surface into which recess the fuel is directed when the piston is near the top of its stroke.

15. An engine according to claim 14, wherein the recess is a piston bowl in the upper surface of the piston.

16. An engine according to claim 15, wherein the trapped volume in the cylinder at top dead centre including the piston bowl and all clearances amount to less than 3% of the total cylinder volume at bottom dead centre.

17. An engine according to claim 1, wherein the air inlet valve does not protrude into the cylinder when the valve is open.

18. An engine according to claim 15, wherein the trapped volume in the cylinder at top dead centre including the piston bowl and all clearances amount to less than 2%.

19. An engine according to claim 1, wherein a restricted aperture is provided to allow a throttled flow of hot compressed air into the combustion chamber and a valve is provided to control the flow of compressed air through the restricted aperture on engine start-up.

20. An engine according to claim 19, wherein the restricted aperture is a separate opening in the cylinder.

21. An engine according to claim 19, wherein the restricted aperture is the gap between the air inlet valve and the valve seat when the air inlet valve is partially open.

22. A method of starting up an engine according to claim 19, the start-up method comprising bleeding a flow of hot, compressed air through the restricted aperture into the combustion chamber at a time when the cylinder pressure is low.

23. A method of starting up an engine according to claim 22, wherein the compressed air is heated by a heater which heats a pipe supplying the compressed air to the combuster.

24. A method according to claim 23, wherein the hot compressed air is bled into the combustion chamber during the final stages of closing of the exhaust valve.

25. A method according to claim 24 further comprising closing the restricted aperture gradually once the fuel is ignited.

26. A method according to claim 23, further comprising shutting off the restricted aperture once the fuel is ignited.

27. An engine according to claim 1, wherein the control means are arranged to control the air inlet valve in relation to the combustion in the combustion chamber such that the air inlet valve is not closed before combustion is initiated.

28. An engine according to claim 27, wherein the control means is configured such that under normal operating conditions the gap between the initiation of combustion and the inlet valve being closed is at least 15° of crankangle of a nominal shaft driving the piston.

29. An engine according to claim 27, wherein the control means is configured such that under normal operating conditions the gap between the initiation of combustion and the inlet valve being closed is at least 25° of crankangle of a nominal shaft driving the piston.

30. An engine according to claim 27, wherein the control means is configured such that under normal operating conditions the gap between the initiation of combustion and the inlet valve being closed is at 30° of crank angle of a nominal shaft driving the piston.

31. An engine according to claim 1, wherein the or each inlet valve is associated with an air inlet port, the or each air inlet port being associated with a column defined as the envelope formed by the translation of the area of the inlet port in the direction in which the piston reciprocates; the fuel injector being arranged to direct at least 50% of the fuel towards the column or columns.

32. An engine according to claim 1, wherein the engine is not a spark ignited engine.

33. A method of starting up an engine according to claim 1 and further comprising a reservoir of compressed air and a heater, the method of starting up the engine comprising the steps of heating air from the compressed air reservoir, feeding the hot compressed air into the or each combustion chamber, and expanding the hot compressed air in the or each combustion chamber in order to move the piston out of the combustion chamber.

34. An engine according to claim 1, wherein the control means is configured such that the gap between the closure of the exhaust valve and the opening of the air inlet valve is at least 15° of crank angle of a nominal crank shaft driving the piston.

35. An engine according to claim 1, wherein the control means is configured such that the gap between the closure of the exhaust valve and the opening of the air inlet valve is at least 20° of crank angle of a nominal crank shaft driving the piston.

36. An engine according to claim 1 or claim 2, wherein the control means is configured such that the gap between closing the exhaust valve and top dead centre is at least 15° of crank angle of a nominal crank shaft driving the piston.

37. An engine according to claim 1 or claim 2, wherein the control means is configured such that the gap between closing the exhaust valve and top dead centre is at least 20° of crank angle of a nominal crank shaft driving the piston.

38. An engine according to claim 1, wherein the or each inlet valve is associated with an air inlet port, the or each air inlet port being associated with a column defined as the envelope formed by the translation of the area of the inlet port in the direction in which the piston reciprocates; the fuel injector being arranged to direct at least 70% of the fuel towards the column or columns.

39. An engine according to claim 1, wherein the or each inlet valve is associated with an air inlet port, the or each air inlet port being associated with a column defined as the envelope formed by the translation of the area of the inlet port in the direction in which the piston reciprocates; the fuel injector being arranged to direct 100% of the fuel towards the column or columns.

40. A method of operating a two stroke internal combustion engine comprising at least one cylinder, the or each cylinder having a piston reciprocably movable within the cylinder and defining a combustion chamber, the or each combustion chamber having a compressed air inlet port with an air inlet valve for controlling flow into the combustion chamber, a fuel injector, and an exhaust port with an exhaust valve for controlling the flow out of the combustion chamber; the method comprising repeating the steps of: opening the exhaust valve; moving the piston into the combustion chamber to force exhaust gas from the combustion chamber; closing the exhaust valve before the piston reaches top dead centre and trapping some exhaust gas in the combustion chamber; compressing the exhaust gas by further movement of the piston; initiating the opening of the air inlet valve; and introducing fuel into the combustion chamber once the exhaust gas has been compressed to the extent that the temperature in the combustion chamber is sufficient to ignite and combust the fuel expanding the hot combustion gases so as to perform work on the piston.

41. A method according to claims 40 wherein the fuel is natural gas.

42. A method according to claim 40 or claim 2 wherein the exhaust valve is closed at least 10° of crank angle of a nominal crank shaft driving the piston before the air inlet valve is opened.

43. A method according to claim 40, wherein the exhaust valve is closed at least 10° of crank angle of a nominal crank shaft driving the piston before top dead centre of the piston.

44. A method according to claim 43, wherein the air inlet is opened just before top dead centre.

45. A method according to claim 43, further comprising injecting fuel into the combustion chamber at substantially the same time as the compressed air is introduced into the combustion chamber.

46. A method according to claim 45, further comprising injecting a small amount of fuel into the combustion chamber after the exhaust valve has closed and before top dead centre.

47. A method according to claim 46, wherein the small amount of fuel is of the same type as that used for the main injection and is injected through the fuel injector.

48. A method according to claim 43, wherein the step of introducing the compressed air is done without the air inlet valve protruding into the combustion chamber.

49. A method according to claim 43, further comprising the step of initiating combustion before closing the air inlet valve.

50. A method according to claim 49, wherein under normal operating conditions combustion is initiated at least 15° before the inlet valve is closed.

51. A method according to claim 49, wherein under normal operating conditions combustion is initiated at least 25° before the inlet valve is closed.

52. A method according to claim 49, wherein under normal operating conditions combustion is initiated at least 30° before the inlet valve is closed.

53. A method according to claim 40 or claim 41, wherein the exhaust valve is closed at least 15° of crank angle of a nominal crank shaft driving the piston before the air inlet valve is opened.

54. A method according to claim 40, or claim 41, wherein the exhaust valve is closed at least 20° of crank angle of a nominal crank shaft driving the piston before the air inlet valve is opened.

55. A method according to claim 40, wherein the exhaust valve is closed at least 15° of crank angle of a nominal crank shaft driving the piston before top dead centre of the piston.

56. A method according to claim 40, wherein the exhaust valve is closed at least 20° of crank angle of a nominal crank shaft driving the piston before top dead centre of the piston.

57. A two stroke internal combustion engine comprising at least one cylinder, the or each cylinder having a piston reciprocably movable within the cylinder and defining a combustion chamber, the or each combustion chamber having a compressed air inlet port with an air inlet valve for controlling flow into the combustion chamber, a fuel injector through which fuel is injected into the combustion chamber, and an exhaust port with an exhaust valve for controlling flow out of the combustion chamber; and control means for controlling the air inlet valve in relation to the combustion in the combustion chamber, such that the air inlet valve is not closed before combustion is initiated.

58. An engine according to claim 57, wherein the control means is configured such that under normal operating conditions the gap between the initiation of combustion and the air inlet valve reaching its closed position is at least 15° of crankangle of a nominal crankshaft driving the piston.

59. An engine according to claim 58, wherein the or each inlet valve is associated with an air inlet port, the or each air inlet port being associated with a column defined as the envelope formed by the translation of the area of the inlet port, in the direction in which the piston reciprocates; the fuel injector being arranged to direct at least 50% of the fuel towards the column or columns.

60. An engine according to claim 57 or claim 43, wherein the control means is configured to inject a small amount of fuel into the combustion chamber before top dead centre.

61. An engine according to claim 58, wherein the or each inlet valve is associated with an air inlet port, the or each air inlet port being associated with a column defined as the envelope formed by the translation of the area of the inlet port in the direction in which the piston reciprocates; the fuel injector being arranged to direct at least 70% of the fuel towards the column or columns.

62. An engine according to claim 58, wherein the or each inlet valve is associated with an air inlet port, the or each air inlet port being associated with a column defined as the envelope formed by the translation of the area of the inlet port in the direction in which the piston reciprocates; the fuel injector being arranged to direct at least 100% of the fuel towards the column or columns.

63. An engine according to claim 57, wherein the control means is configured such that under normal operating conditions the gap between the initiation of combustion and the air inlet valve reaching its closed position is at least 25° of crankangle of a nominal crankshaft driving the piston.

64. An engine according to claim 57, wherein the control means is configured such that under normal operating conditions the gap between the initiation of combustion and the air inlet valve reaching its closed position is at least 30° of crankangle of a nominal crankshaft driving the piston.

65. A method of operating a two stroke internal combustion engine comprising at least one cylinder, the or each cylinder having a piston reciprocably movable within the cylinder and defining a combustion chamber, the or each combustion chamber having a compressed air inlet port with an air inlet valve controlling flow into the combustion chamber, a fuel injector and an exhaust port with an exhaust valve for controlling the flow out of the combustion chamber; the method comprising repeating the steps of: opening the exhaust valve; moving the piston into the combustion chamber to force exhaust gas from the combustion chamber; closing the exhaust valve; injecting fuel, initiating the opening of the air inlet valve and initiating combustion; and subsequently closing the air inlet valve, such that the air inlet valve is not closed before combustion is initiated.

66. A method according to claim 65, wherein combustion is initiated under normal operating conditions at least 15° before the air inlet valve is closed.

67. A method according to claim 46 or claim 66, wherein a small amount of fuel is injected prior to top dead centre.

68. A method according to claim 65, wherein combustion is initiated under normal operating conditions at least 25° before the air inlet valve is closed.

69. A method according to claim 65, wherein combustion is initiated under normal operating conditions at least 30° before the air inlet valve is closed.

70. A two stroke internal combustion engine comprising at least one cylinder, the or each cylinder having a piston reciprocably movable within the cylinder and defining a combustion chamber, the or each combustion chamber having: at least one compressed air inlet port with an associated air inlet valve for controlling flow into the combustion chamber, the or each air inlet port associated with a column defined as the envelope formed by the translation of the area of the inlet port in the direction in which the piston reciprocates; at least one exhaust port with an exhaust valve for controlling flow out of the combustion chamber; and a fuel injector through which fuel is injected into the combustion chamber, the fuel injector being arranged to direct a total of at least 50% of the fuel directly towards individual ones of the column or columns but not towards the or each air inlet valve.

71. A engine according to claim 70, wherein the fuel injector is arranged to direct at least 70% of the fuel towards the individual ones of the column or columns.

72. An engine according to claim 71, wherein the or each combustion chamber has two or more compressed air inlet ports, all of which are arranged on the same side of the cylinder, and wherein the fuel injector is arranged to direct at least 80%, of the fuel towards the side of the cylinder which contains the air inlet ports.

73. An engine according to claim 70 or 50, wherein the fuel injector is arranged to inject the fuel at an angle of less than 10° with respect to the cylinder head.

74. An engine according to claim 71, wherein the or each combustion chamber has two or more compressed air inlet ports, all of which are arranged on the same side of the cylinder, and wherein the fuel injector is arranged to direct at least 90% of the fuel towards the side of the cylinder which contains the air inlet ports.

75. A engine according to claim 70, wherein the fuel injector is arranged to direct at least 70% of the fuel towards the individual ones of the column or columns.

76. A engine according to claim 70, wherein the fuel injector is arranged to direct 100% of the fuel towards the individual ones of the column or columns.

77. An engine according to claim 70 or 71, wherein the fuel injector is arranged to inject the fuel at an angle of less than 50° with respect to the cylinder head.

78. A method of operating a two stroke internal combustion engine comprising at least one cylinder, the or each cylinder having a piston reciprocably movable within the cylinder and defining a combustion chamber, the or each combustion chamber having: at least one compressed air inlet port with an air inlet valve controlling flow into the combustion chamber, each port being associated with a column defined as the envelope formed by the translation of the area of the inlet port in the direction in which the piston reciprocates; at least one exhaust port with an exhaust valve for controlling the flow out of the combustion chamber; and a fuel injector for injecting fuel into the combustion chamber; the method comprising the step of injecting at a total of at least 50% of the fuel directly towards individual ones of the column or columns but not towards the or each air inlet valve.

79. A method according to claim 78, comprising the step of directing at least 70% of the fuel towards the individual ones of the column or columns.

* * * * *